United States Patent [19]

Yamada

[11] Patent Number: 5,341,279

[45] Date of Patent: Aug. 23, 1994

[54] SWITCHING POWER SUPPLY CIRCUIT PROVIDING REDUCED POWER LOSS UPON TERMINATION OF OPERATION OF A STARTING POWER SUPPLY CIRCUIT

[75] Inventor: Masanori Yamada, Yamanashi, Japan

[73] Assignee: NEC Corporation, Tokyo, Japan

[21] Appl. No.: 73,068

[22] Filed: Jun. 8, 1993

[30] Foreign Application Priority Data

Jun. 9, 1992 [JP] Japan .................................. 4-173654

[51] Int. Cl.[5] ...................... H02M 3/335; H02M 3/22; H02J 1/00
[52] U.S. Cl. ......................................... 363/21; 363/15
[58] Field of Search ...................... 363/21, 25, 34, 15, 363/97; 323/207, 224

[56] References Cited

U.S. PATENT DOCUMENTS 5,034,871  7/1991  Okamoto et al. .................. 363/21 X
5,267,136  11/1993 Suga et al. ......................... 363/21 X Primary Examiner—Steven L. Stephan
Attorney, Agent, or Firm—Sughrue, Mion, Zinn, Macpeak & Seas

[57] ABSTRACT

A switching power supply circuit includes a DC/DC converter, a control circuit, a first auxiliary power supply circuit, and a second auxiliary power supply circuit. The DC/DC converter has a transistor for switching a DC input voltage. The control circuit controls the ON/OFF time of the transistor to keep a DC output voltage from the DC/DC converter constant. The first auxiliary power supply circuit supplies power to the control circuit during a normal switching operation period of the transistor. The second auxiliary power supply circuit supplies power to the control circuit when a DC input voltage is applied to the switching power supply circuit. The second auxiliary power supply circuit is controlled by an output voltage from the first auxiliary power supply circuit to stop the supply of power.

5 Claims, 2 Drawing Sheets

SWITCHING POWER SUPPLY CIRCUIT PROVIDING REDUCED POWER LOSS UPON TERMINATION OF OPERATION OF A STARTING POWER SUPPLY CIRCUIT

BACKGROUND OF THE INVENTION

The present invention relates to a switching power supply circuit and, more particularly, to an auxiliary power supply circuit for supplying starting power to a control circuit for ON/OFF-controlling a switching transistor.

FIG. 2 shows a conventional switching power supply circuit for converting an AC voltage into a DC voltage.

Reference numeral 1 denotes a rectifier for rectifying an AC input voltage. Reference symbol Q1 denotes a switching transistor for converting a DC voltage output from the rectifier 1 into an AC voltage having a high frequency, e.g., several 10 kHz; and T1, a transformer having a primary winding L1 on the input side, and a secondary winding L2 on the output side. The primary winding L1 is insulated from the secondary winding L2. The transformer T1 induces a predetermined AC voltage in the secondary winding L2 by using a high-frequency AC current flowing in the primary winding L1. Reference numeral 2 denotes a rectifying/smoothing circuit for rectifying an AC voltage induced in the secondary winding L2 of the transformer T1 and applying the resultant DC output voltage to a load (not shown). The rectifier 1, the transistor Q1, the transformer T1, and the rectifying/smoothing circuit 2 constitute an AC/DC converter.

Reference numeral 3 denotes a PWM (Pulse Width Modulation) control circuit for outputting a control signal for ON/OFF-controlling the transistor Q1. The PWM control circuit 3 compares a DC output voltage output from the rectifying/smoothing circuit 2 with a triangular voltage generated by an oscillator (not shown) incorporated in the circuit 3, and changing the pulse width of a pulse signal constituting a control signal to change the ON/OFF time of the transistor Q1, thereby keeping the DC output voltage constant. Reference numeral 4 denotes a starting auxiliary power supply circuit constituted by a resistor R1. The resistor R1 serves to supply power to the PWM control circuit 3 when an AC input voltage is applied, i.e., when application of a DC voltage from the rectifier 1 is started. Reference symbol L3 denotes an auxiliary winding L3 on the primary side of the transformer T1; and D1, a diode for rectifying an AC voltage induced in the auxiliary winding L3. Reference numeral 5 denotes a voltage regulator for regulating a DC voltage rectified by the diode D1 to a predetermined voltage. Reference symbol D2 denotes a diode for preventing a reverse current to the voltage regulator 5. These components constitute an auxiliary power supply circuit 6 for a normal operation. The auxiliary power supply circuit 6 supplies power to the PWM control circuit 3 after the transistor Q1 starts a switching operation.

An operation of the above-described conventional switching power supply circuit will be described next.

When an AC input voltage is applied to the switching power supply circuit, a DC voltage is applied from the rectifier 1. At this time, since the transistor Q1 is OFF and does not start switching, no voltage is generated in the auxiliary winding L3 of the transformer T1. For this reason, when an AC input voltage is applied to the switching power supply circuit, i.e., when application of an DC voltage from the rectifier 1 is started, the starting auxiliary power supply circuit 4 constituted by the resistor R1 supplies a starting current to the PWM control circuit 3 by using the output from the rectifier 1. With this operation, the PWM control circuit 3 is started.

Immediately after the starting operation, the PWM control circuit 3 outputs a control pulse signal having a long ON time because the DC output voltage from the rectifying/smoothing circuit 2 is lower than the triangular voltage. The transistor Q1 starts a switching operation in accordance with this control signal. With this switching operation of the transistor Q1, the DC voltage from the rectifier 1 is converted into a high-frequency AC voltage. After the AC voltage is increased or decreased to a predetermined voltage by the transformer T1, a stable DC output voltage is output from the rectifying/smoothing circuit 2. As the DC output voltage from the rectifying/smoothing circuit 2 is increased by the initial switching operation with a long ON time, the PWM control circuit 3 outputs a control pulse whose ON Time is shortened in reverse proportion to the increase in DC output voltage. Therefore, the DC output voltage from the rectifying/smoothing circuit 2 is stabilized. By changing the ON/OFF time of the transistor Q1 in this manner, the DC output voltage is stabilized to become a constant voltage.

When an AC current starts to flow in the transformer T1 after the transistor Q1 starts the switching operation, an AC voltage is induced in the auxiliary winding L3 of the transformer T1. A constant voltage is generated by inputting this AC voltage to the voltage regulator 5 through the diode D1. As a result, the auxiliary power supply circuit 6 for a normal operation applies the DC voltage generated by the voltage regulator 5 to the PWM control circuit 3 through the diode D2.

In the conventional switching power supply circuit, however, even after the transistor Q1 starts a switching operation and the auxiliary power supply circuit 6 starts to supply power for a normal operation, a current from the rectifier 1 keeps flowing in the resistor R1, resulting in a great loss. In this case, the loss becomes 10 W or more depending on the type and the manner of use of a power supply unit.

This problem becomes conspicuous especially when an operation during a non-load period is to be guaranteed. More specifically, when the auxiliary power supply circuit for the PWM control circuit 3 is simplified most, the power supply unit may not be properly operated without a load. In a general computer or the like, an operation card and the like may be provided as options. In this case, the power supply unit has no load. Assume that such a computer has a function of detecting power abnormality. In this case, if the computer incorporates a power supply unit which is not properly operated during a non-load period, power abnormality is erroneously detected. Therefore, a power supply unit which can be stably operated regardless of the presence/absence of a load is required.

In a power supply unit which provides operation guarantee during a non-load period, since the switching operation of the transistor Q1 becomes intermittent, sufficient power cannot be supplied from the auxiliary winding L3 of the transformer T1. For this reason, most of the driving power required for the PWM control circuit 3 must be supplied through the resistor R1. If the value of the resistor R1 is set in consideration of this situation to supply a current required to drive the PWM control circuit 3, the loss at the resistor R1 is further increased, resulting in a deterioration in the efficiency of the overall power supply unit. Furthermore, in this case, a high-power resistor must be used as the resistor R1, which is large in size, and needs to be spaced apart from other components because it generates heat. Such a resistor inevitably interferes with attempts to reduce the size of the power supply unit.

SUMMARY OF THE INVENTION

It is an object of the present invention to provide an efficient switching power supply circuit.

It is another object of the present invention to provide a compact switching power supply circuit.

In order to achieve the above objects, according to the present invention, there is provided a switching power supply circuit comprising a DC/DC converter having a transistor for switching a DC input voltage, a control circuit for controlling an ON/OFF time of the transistor to keep a DC output voltage from the DC/DC converter constant, a first auxiliary power supply circuit for supplying power to the control circuit during a normal switching operation period of the transistor, and a second auxiliary power supply circuit for supplying power to the control circuit when a DC input voltage is applied to the switching power supply circuit, the second auxiliary power supply circuit being controlled by an output voltage from the first auxiliary power supply circuit to stop supply of power.

DESCRIPTION OF THE PREFERRED EMBODIMENT

Figure 1:
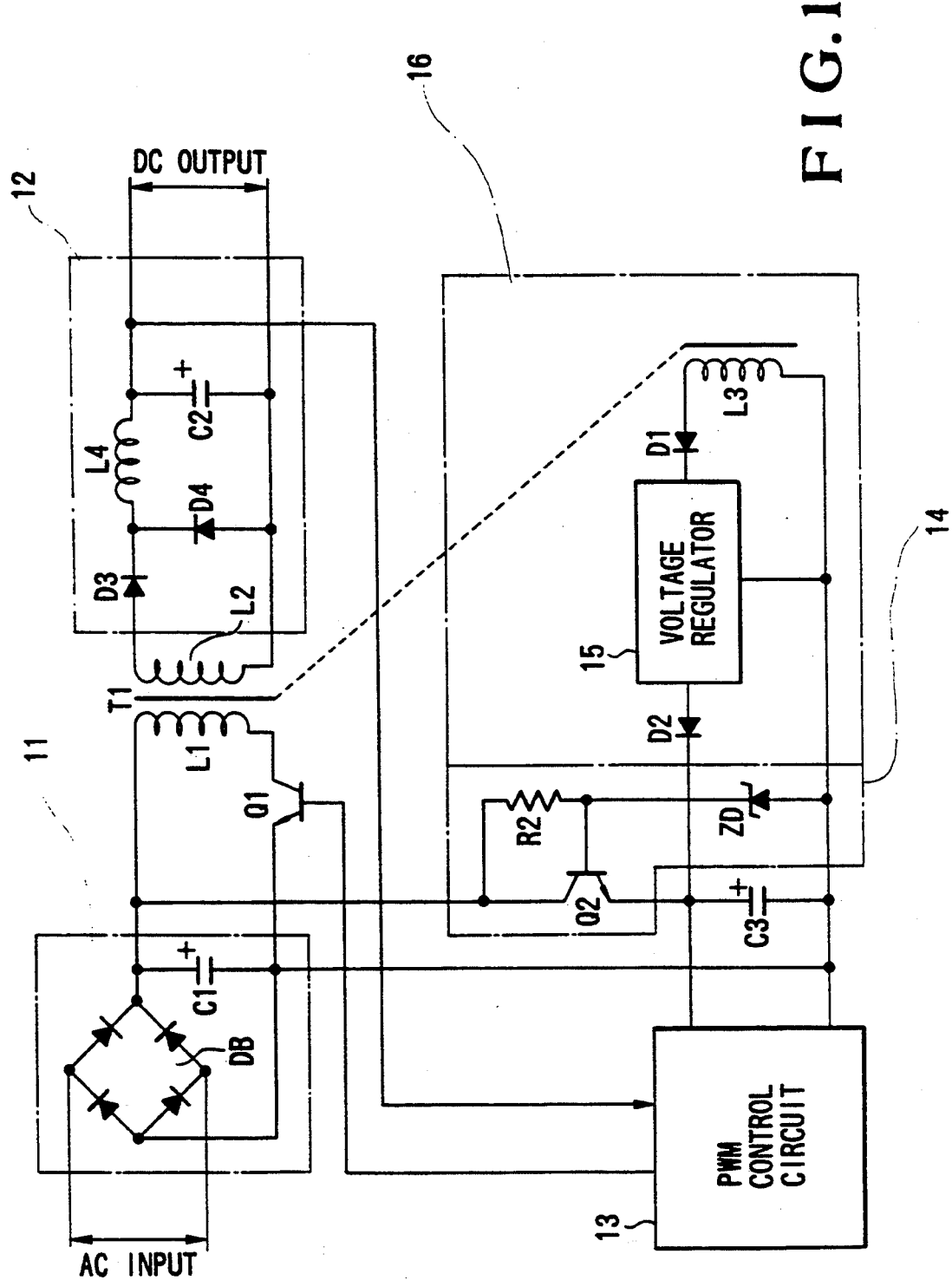
FIG. 1 is a circuit diagram showing a switching power supply circuit according to an embodiment of the present invention.

An embodiment of the present invention will be described below with reference to the accompanying drawings. FIG. 1 shows a switching power supply circuit according to an embodiment of the present invention. Referring to FIG. 1, reference numeral 11 denotes a rectifier for rectifying an AC input voltage by using a diode bridge DB, and smoothing the voltage by using a capacitor C1. Reference symbol Q1 denotes an npn switching transistor Q1 for converting a DC voltage output from the rectifier 11 into an AC voltage having a high frequency, e.g., several 10 kHz; and T1, a transformer having a primary winding L1 on the input side, and a secondary winding L2 on the output side. The primary winding L1 is insulated from the secondary winding L2. The transformer T1 induces a predetermined AC voltage in the secondary winding L2 by using a high-frequency AC current flowing in the primary winding L1. Reference numeral 12 denotes a rectifying/smoothing circuit for rectifying an AC voltage, induced in the secondary winding L2 of the transformer T1, by using diodes D3 and D4, and outputting the DC voltage smoothed by a capacitor C2. The DC output voltage from the rectifying/smoothing circuit 12 is applied to a load (not shown). Reference symbol L4 denotes an inductor for preventing a reverse current. The transistor Q1, the transformer T1, and the rectifying/smoothing circuit 12 constitute a DC/DC converter.

Reference numeral 13 denotes a PWM control circuit for outputting a control signal for ON/OFF-controlling the transistor Q1. The PWM control circuit 13 compares a DC output voltage output from the rectifying/smoothing circuit 12 with a triangular voltage generated by an oscillator (not shown) incorporated in the circuit 13, and changing the pulse width of a control signal constituted by a pulse signal to change the ON/OFF time of a transistor Q2, thereby performing control to keep the DC output voltage constant.

Reference numeral 14 denotes a starting auxiliary power supply circuit for supplying power to the PWM control circuit 13 when an AC input voltage is applied to the switching power supply circuit, i.e., when the rectifier 11 starts to apply a DC voltage. The auxiliary power supply circuit 14 is constituted by a dropper type regulator including the npn transistor Q2, a zener diode ZD, and a resistor R2.

Reference numeral 16 denotes an auxiliary power supply circuit 16 for a normal operation. The auxiliary power supply circuit 16 supplies power to the PWM control circuit 13 in a normal operation after the transistor Q1 starts a switching operation. The auxiliary power supply circuit 16 is constituted by an auxiliary winding L3 on the primary side of the transformer T1, a diode D1 for rectifying an AC voltage inducted in the auxiliary winding L3, a voltage regulator 15 for regulating a DC voltage rectified by the diode D1 to a predetermined voltage, and a diode D2 for preventing a reverse current to the voltage regulator 15. Reference symbol C3 denotes a capacitor for holding power during a period in which switching from the starting auxiliary power supply circuit 14 to the auxiliary power supply circuit 16 for a normal operation is performed.

An operation of the above-described switching power supply circuit will be described next.

In the auxiliary power supply circuit 14, the base of the transistor Q2 is clamped by the Zener diode ZD. When no voltage is output from the voltage regulator 15, an emitter voltage VE of the transistor Q2 is given by $$VE = VZ - VBE \qquad (1)$$

where VZ is the Zener voltage of the Zener diode ZD, and VBE is the base-emitter voltage of the transistor Q2.

In this case, a voltage obtained by subtracting a voltage drop across the diode D2 from the output voltage of the voltage regulator 15 in a normal operation is set to be higher than the emitter voltage VE of the transistor Q1. That is, as indicated by equation (1), the above-mentioned voltage is set to be higher than a value obtained by subtracting the base-emitter voltage of the transistor Q2 from the Zener voltage VZ of the Zener diode ZD. Such a value can be easily set by properly selecting the voltage regulator 15 or by an adjusting circuit incorporated in the switching power supply circuit.

When an AC input voltage is applied to the switching power supply circuit, i.e., when the rectifier 11 starts to apply a DC voltage, the transistor Q1 does not perform a normal switching operation, and a lower voltage is output from the voltage regulator 15 on the basis of an AC voltage induced in the auxiliary winding L3 of the transformer T1. For this reason, the base-emitter path of the transistor Q2 is forward-biased to turn on the transistor Q2, thereby supplying power supply voltage from the starting auxiliary power supply circuit 14 to the PWM control circuit 13.

After the switching operation of the transistor Q1 is set in a normal state, a sufficiently high AC voltage is induced in the auxiliary winding L3 of the transformer T1. Therefore, the voltage output from the voltage regulator 15 becomes equal to a preset voltage. As described above, since this output voltage is higher than the emitter voltage VE of the transistor Q2 even in consideration of a voltage drop across the diode D2, the base-emitter path of the transistor Q2 is reverse-biased to turn off the transistor Q2, thereby stopping the supply of power from the starting auxiliary power supply circuit 14. With this operation, power is supplied from only the auxiliary power supply circuit 16 for a normal operation to the PWM control circuit 13 during a normal operation of the transistor Q1.

In a DC output without a load, the switching operation of the transistor Q1 becomes intermittent, and a normal switching operation is not performed. For this reason, only a low AC voltage is induced in the auxiliary winding L3 of the transformer T1. Consequently, the voltage output from the voltage regulator 15 becomes lower than the emitter voltage VE of the transistor Q1. The base-emitter path of the transistor Q2 is then forward-biased to turn on the transistor Q2, thus supplying power from the starting auxiliary power supply circuit 14 to the PWM control circuit 13.

That is, the starting auxiliary power supply circuit 14 serves as an opening/closing means for ON/OFF-controlling the supply of power to the PWM control circuit 13 in accordance with the switching state of the switching transistor Q1.

Figure 2:
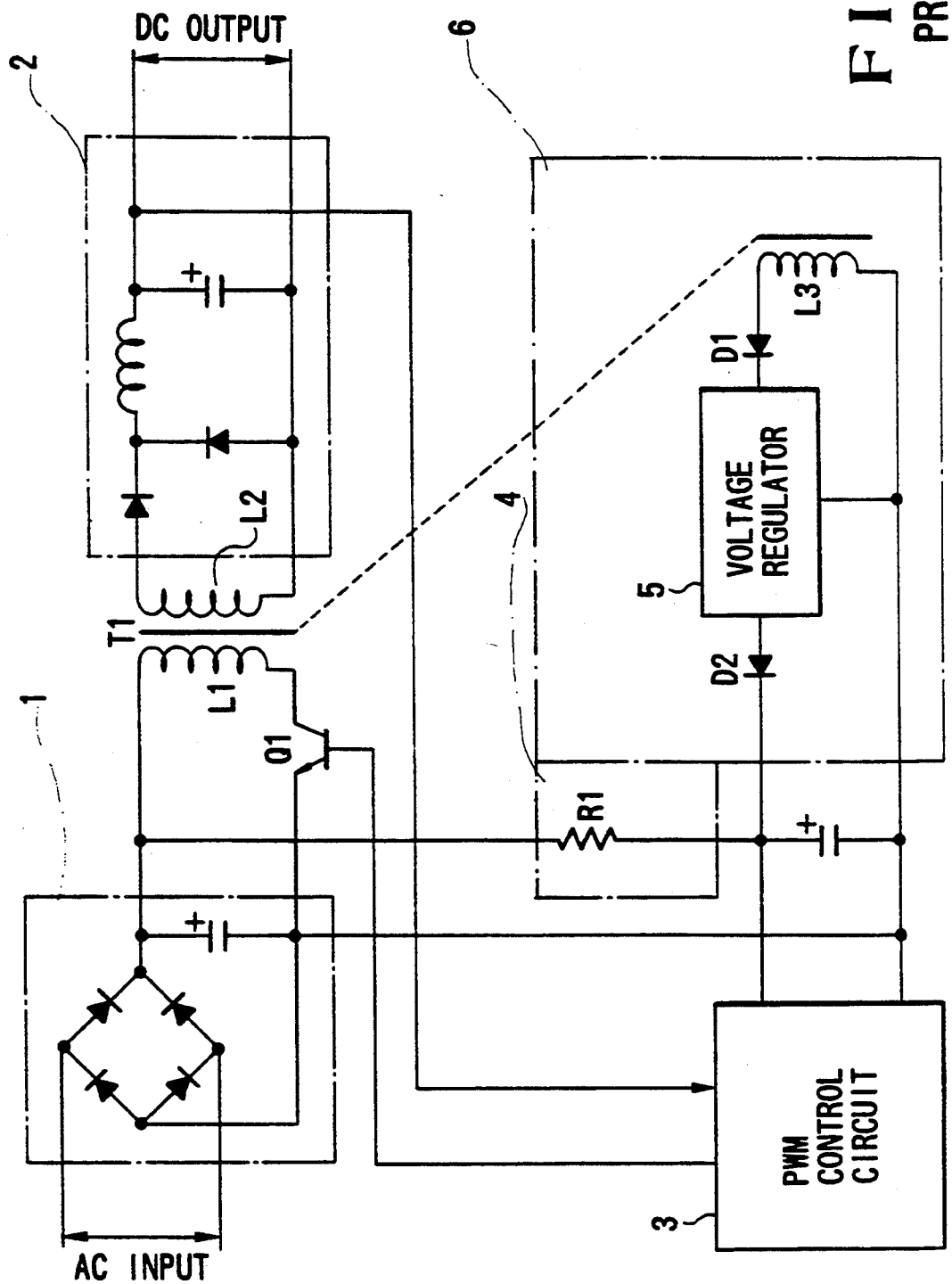
FIG. 2 is a circuit diagram showing a conventional switching power supply circuit.

Note that a power loss in the starting auxiliary power supply circuit 14 during an OFF period of the transistor Q2 is caused by a current slightly flowing in the resistor R2 and the Zener diode ZD. As compared with the loss caused by the resistor R1 in the conventional circuit shown in FIG. 2, a loss reduction of about 6 W can be expected in, e.g., a 100-W power supply unit. In general, the efficiency of a switching power supply unit is about 80%. In this embodiment, however, the efficiency can be increased to about 84%.

As has been described above, according to the present invention, when a DC input voltage is applied to the switching power supply circuit or no load is present, power is supplied from the starting auxiliary power supply circuit constituted by a dropper type regulator or the like to the PWM control circuit. During a normal operation period, in which the transistor performs a normal switching operation, power is supplied from only the auxiliary power supply circuit for a normal operation to the PWM control circuit. Therefore, the power loss in the starting auxiliary power supply circuit is greatly reduced as compared with the prior art, and the efficiency of the overall power supply unit can be improved. In addition, the power supply unit can be reduced in size because no high-power resistor is required.

What is claimed is:

1. A switching power supply circuit comprising:
    a DC/DC converter for converting a DC input voltage into a DC output voltage, said DC/DC converter having a first transistor for switching said DC input voltage;
    a control circuit for controlling an ON/OFF time of said first transistor to keep said DC output voltage from said DC/DC converter constant;
    a first auxiliary power supply circuit for supplying a first power voltage generated by said DC/DC converter to said control circuit during a normal switching operation period of said first transistor; and
    a second auxiliary power supply circuit for supplying a second power voltage based on said DC input voltage to said control circuit when said DC input voltage is initially applied to said DC/DC converter, said second auxiliary power supply circuit being controlled by said first power voltage output from said first auxiliary power supply circuit to terminate supply of said second power voltage to said control circuit, said first power voltage from said first auxiliary power supply being set higher than said second power voltage from said second auxiliary power supply.

2. The circuit according to claim 1, wherein said second auxiliary power supply circuit is constituted by a second transistor having a collector connected to one power supply for a DC input voltage, and an emitter connected to an output of said first auxiliary power supply circuit, a resistor connected between the collector and a base of said second transistor, and a constant voltage circuit connected between the base of said second transistor and the other power supply for a DC input voltage.

3. The circuit according to claim 2, wherein said first auxiliary power supply circuit includes a voltage regulator for outputting a predetermined voltage, an output voltage from said voltage regulator being set to be higher than a value obtained by subtracting a base-emitter voltage of said second transistor from a constant voltage generated by said constant voltage circuit.

4. The circuit according to claim 1, wherein said first auxiliary power supply circuit outputs a predetermined DC voltage to said control circuit and to said second auxiliary power supply circuit on the basis of an AC voltage generated in an auxiliary winding of a transformer constituting said DC/DC converter.

5. The circuit according to claim 1, wherein supply of said second power voltage from said second auxiliary power supply circuit is terminated when said first power voltage from said first auxiliary power supply circuit is higher than said second power voltage from said second auxiliary power supply circuit so that supply of power to said control circuit is automatically switched from said second auxiliary power supply circuit to said first auxiliary power supply circuit.

* * * * *